United States Patent [19]

Haafkens et al.

[11] 4,249,609
[45] Feb. 10, 1981

[54] METHOD FOR FORMING CHANNELS OF HIGH FLUID CONDUCTIVITY IN FORMATION PARTS AROUND A BOREHOLE

[75] Inventors: Rudolf Haafkens; Rafael F. Luque; Willem De Vries, all of Rijswijk, Netherlands

[73] Assignee: Shell Internationale Research Maatschappij B.V., Netherlands

[21] Appl. No.: 27,052

[22] Filed: Apr. 4, 1979

[30] Foreign Application Priority Data

Apr. 10, 1978 [GB] United Kingdom ............... 13952/78

[51] Int. Cl.³ ...................... E21B 43/267; E21B 43/27
[52] U.S. Cl. .................................. 166/280; 166/307; 166/308
[58] Field of Search ............... 166/307, 308, 280, 283, 166/281

[56] References Cited

U.S. PATENT DOCUMENTS

| | | | |
|---|---|---|---|
| 2,689,009 | 9/1954 | Brainerd et al. | 166/307 X |
| 3,167,123 | 1/1965 | Graham et al. | 166/307 UX |
| 3,167,124 | 1/1965 | Graham | 166/308 |
| 3,592,266 | 7/1971 | Tinsley | 166/283 |
| 3,727,689 | 4/1973 | Clampitt | 166/307 X |
| 3,799,266 | 3/1974 | Kiel | 166/307 X |
| 3,918,524 | 11/1975 | Broaddus et al. | 166/307 |
| 3,960,736 | 6/1976 | Free et al. | 166/308 X |

*Primary Examiner*—Stephen J. Novosad
*Attorney, Agent, or Firm*—Pravel, Gambrell, Hewitt, Kirk, Kimball & Dodge

[57] ABSTRACT

A method for increasing the productivity of wells completed in soft acid-soluble producing formations, comprising the steps of: producing in such formation a fracture containing a viscous fluid; injecting an acid solution wherein the viscosity of the contained fluid is preferably at least 50 times greater than the acid solution into the formation to create acid etched fingering channels; injecting into the formation a fluid with a propping agent the viscosity of which is at least equal to the acid solution until propping agent is deposited in the fracture at least in those areas where channels have been etched; and lowering the pressure within the fracture to allow it to move towards a closed position. By controlling the viscosity ratios of viscous fluid to acid solution and carrying fluid to acid solution long fingering acid etched channels are created and propped such that the channel walls of the soft formation are propped open when the fluid pressure in the fracture is reduced.

11 Claims, 8 Drawing Figures

METHOD FOR FORMING CHANNELS OF HIGH FLUID CONDUCTIVITY IN FORMATION PARTS AROUND A BOREHOLE

BACKGROUND OF THE INVENTION

The invention relates to a method for forming channels of high fluid conductivity in formation parts around a borehole penetrating such formation. In particular, the present invention relates to a method for forming channels of high fluid conductivity in relatively soft acid-soluble formations, such as chalk formations.

The majority of the known techniques designed for increasing the productivity of formations surrounding a borehole apply a combination of formation fracturing and acid treatment. A propping agent may optionally be added for further increasing the productivity.

Many such techniques are known. In British Pat. No. 672,789, a method is described wherein a formation is fractured by injecting a viscous fracturing medium which may have a propping agent added thereto. Subsequently, an acid solution may be injected into the fracture to reduce the viscosity of the fracturing medium and to react with the formation.

U.S. Pat. No. 2,689,009 mentions the injection, at fracturing pressure, of a viscous emulsion of a mineral acid and an oily vehicle, which emulsion carries a propping agent, followed by the injection of a plain acid.

U.S. Pat. No. 3,044,549 describes the injection of a mixture of oil, acid and propping agent at fracturing pressure into an oil-containing formation.

U.S. Pat. Nos. 3,285,340 and 3,481,401 both mention fracturing by means of a viscous medium, followed by the passage of a propping agent into the fracture. Subsequently, the fracture is closed and acid is injected through the fracture containing the propping agent. The agent is either deformable and acid-resistant, or permeable and filled with a surfactant. The agent locally protects the fracture wall against attack by the acid, resulting in the creation of pillars in the fracture walls where they are contacted by the propping agent.

U.S. Pat. No. 3,642,068 describes fracture formation by means of a viscous medium followed by the passage of a propping agent into the fracture. The agent is shifted to a remote location in the fracture by means of an acid that etches those parts of the fracture walls that are close to the borehole. Subsequently the fracture is closed.

U.S. Pat. No. 3,842,911 describes the formation of a fracture and the introduction of propping agent into the fracture, followed by a complete closure of the fracture on the propping agent and the injection of acid under conditions at which the fracture remains closed.

Finally, U.S. Pat. No. 3,768,564 mentions the formation of a fracture without using a propping agent, acidizing the open fracture, and continuing said acidization after the fracture has been closed.

However, none of these prior art techniques provide a solution for the problem of increasing the productivity of relatively soft acid-soluble formations such as chalk formations. Propping agents in fractures formed in such soft formations have been found to be relatively ineffective since they become at least partially embedded in the fracture walls after the fracture is allowed to close, thus allowing the fracture to close around the propping agent. In cases where a channel system is etched in such fracture walls by means of an acid, the etched channel system has been found to collapse and fill up with chalk after the fracture is allowed to close.

SUMMARY OF THE INVENTION

One objective of this invention is to provide a method for creating high conductivity channels in a relatively soft acid-soluble underground formation to increase the productivity thereof, by application of a fracture in this formation and acid-etching the walls thereof in such a manner that the channels are substantially kept intact after the fracture has been allowed to close.

By way of example, the invention may be carried out with the following steps:
(a) installing a casing in such well, and introducing in the wall of said casing a plurality of perforations arranged over at least part of the wall facing such formation;
(b) producing in the formation a fracture containing a viscous fluid which communicates with the perforations.
(c) injecting an acid solution through the perforations into the viscous fluid in the fracture at a pressure at which the fracture remains open, the viscosity ratio between the viscous fluid and the acid solution being chosen such that the viscous fluid is displaced in the fracture in an unstable or irregular manner by the acid solution;
(d) continuing the injection of the acid solution through the perforations until channels have been etched in areas of the fracture walls that face each other;
(e) injecting a viscous carrying fluid containing a propping agent through the perforations into the fracture at a pressure at which the fracture remains open, the viscosity of the carrying fluid being at least equal to the viscosity of the acid solution;
(f) continuing the injection of the carrying fluid until the propping agent is deposited in the fracture between at least part of those areas of the fracture walls wherein channels have been etched;
(g) lowering the fluid pressure in the fracture, thereby allowing the fracture walls to be displaced towards a closing position, in which position the walls of the channels are supported and held open by the propping agent; and
(h) lowering the viscosity of the viscous fluids.

BRIEF DESCRIPTION OF THE DRAWINGS

The invention will be described in more detail by way of example with reference to the drawing, wherein.

DETAILED DESCRIPTION OF THE PREFERRED EMBODIMENTS

Figure 1:
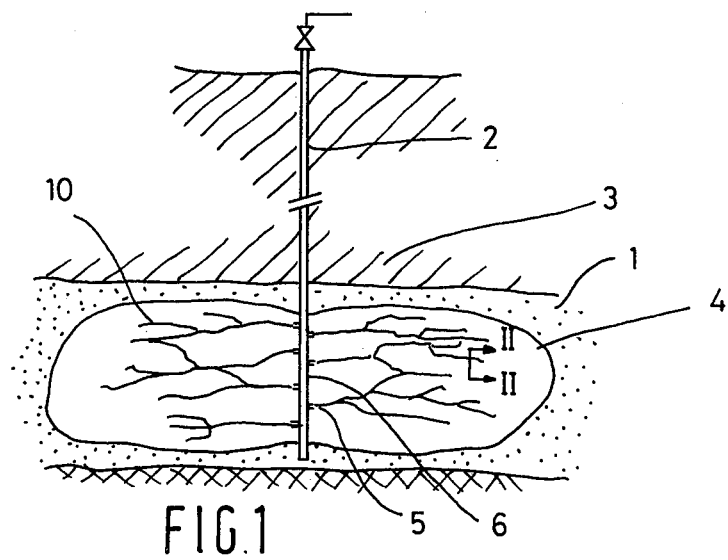
FIG. 1 shows schematically a vertical section across a borehole penetrating a subsurface formation.

The formation 1 shown in FIG. 1 of the drawing consists substantially of chalk containing hydrocarbons in the pore space thereof, which hydrocarbons are to be produced via the borehole or well 2 which penetrates the chalk formation 1 as well as the overlying formation 3. The well 2 is completed with equipment that is normally used for that purpose. Therefore, no details thereof are shown in the drawing.

To increase the productivity of the formation 1 by the method of the present invention, a vertical fracture 4 is formed in the formation around well 2 by injecting a viscous fracturing fluid into the formation. This fluid is passed from the interior of the well 2 into the pore space of the formation 1 via perforations 5 that have been shot in the casing 6 of well 2. The fluid is injected at a pressure adapted for fracturing the formation 1.

Apart from viscous fluids, non-viscous fluids may also be applied for fracturing the formation in the method according to the present invention. When using a non-viscous fracturing fluid (which may contain fluid-loss preventing agents), a viscous fluid is subsequently injected into the fracture formed by the non-viscous fluid which is thereby displaced from the fracture.

The viscous fracturing fluids that may be used in the present method preferably do not contain acid components in amounts that are suitable for etching appreciable parts of the walls of the fracture. Relatively small amounts of acids, however, may be present, such as required for breaking the viscosity of the fluid after a predetermined period when the fluid pressure in the fracture has been released. Examples of viscous fluids that may be used in the present method are gelled water, hydrocarbon-in-water emulsions, water-in-hydrocarbon emulsions, and gelled hydrocarbons. A viscosity breaker may be added to the viscous fluid, which breaks the viscosity of this fluid after a predetermined time interval, either under influence of the temperature prevailing in the fractured formation, or by a retarded chemical reaction, or by any other mechanism. Such viscosity breakers are known per se, and need not be described in detail. The same applies for the fracturing fluid (either viscous or non-viscous), the viscosifying agents and fluid-loss preventing agents that are optionally incorporated therein, and the injection pressures which have to be used to induce a fracture.

Any of the fracturing fluids used in the present method may contain fluid-loss preventing agent.

The fracture 4, after being induced, is kept open by supplying viscous fluid thereto at a sufficiently high pressure. The walls 7 and 8 of the fracture 4 (see FIG. 2 which shows an enlarged detail of section II-II of FIG. 1) are thus kept at a distance of several millimeters from one another, and the space between these walls contains the viscous fluid 9.

Subsequently, an acid solution is pumped down the well under a pressure at which the solution will enter the fracture 4 and keep the walls thereof separated from each other. The solution enters the fracture 4 through perforations 5 in casing 6, which perforations are distributed over that part of the casing 6 which faces the oil-producing part of the formation 1. By a suitable choice of the composition of the fracturing fluid, the original viscosity thereof is substantially maintained at least over the period during which the acid solution is being injected into the fracture that contains the viscous fracturing medium. The acid is injected at a pressure sufficiently high to prevent closing of the fracture 4.

The viscosity of the acid solution to be injected, relative to the viscous fluid contained in the fracture, is chosen such that the acid, upon injection, will displace the viscous fluid in an unstable or irregular manner. By unstable or irregular displacement is meant that the acid solution will progress through the viscous fluid as channels or fingers rather that displacing the viscous fluid as a uniform wave front. Thus such unstable displacement results in a so-called "fingering" of the acid solution through the viscous mass of the fluid. Such unstable displacement is readily achieved at relatively low values of the fluid to acid viscosity ratio, such as in the order of 50. To keep the cross-sectional areas of the flow paths of the acid sufficiently small so as to promote a desirable extension of these flow paths in the fracture in a lateral sense with respect to the well, the viscosity ratio is preferably increased to a value of 150 or greater. An excellent fingering displacement may be reached at a viscosity ratio between 200 and 300.

It will be appreciated that the use of a plurality of perforations 5 in the vertical casing 6 which are arranged at vertically spaced levels over that portion of the casing facing the oil-containing formation 1, results in a plurality of fingering flow paths 10 of the acid through the viscous fluid present in the fracture, which flow paths are substantially evenly distributed over the height of the fracture 4.

Figures 2, 3, 4, 5, 6:
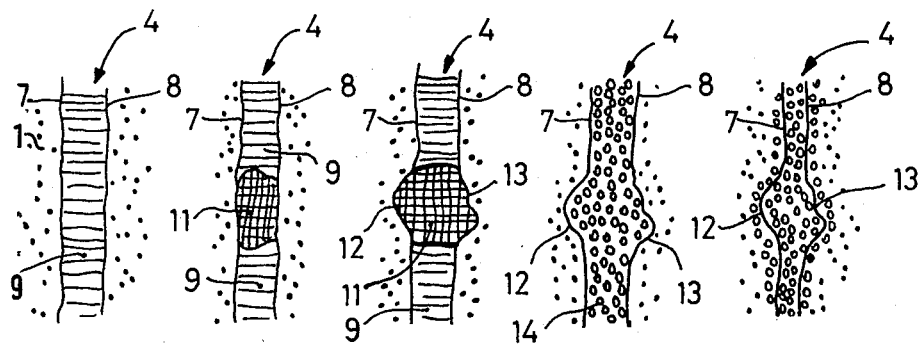
FIG. 2 shows on a larger scale than FIG. 1 the section II-II across the fracture formed in the formation.
FIG. 3 shows the section of FIG. 2, as acid is injected into the fracture.
FIG. 4 shows the section of FIG. 3, when a channel system has been acid etched in the fracture walls.
FIG. 5 shows the section of FIG. 4, when propping agent carried by a medium more viscous than the fracturing medium has been introduced into the fracture.
FIG. 6 shows the section of FIG. 5, after the fracture has been allowed to close.

The fingering paths 10 followed by the acid solution and originating from the perforations 5 form the base of a channel system that is subsequently being etched in the walls 7 and 8 of the fracture 4 by the action of the acid solution on the material of the walls during the continued injection of the acid into the fracture 4. FIG. 3 shows the section of FIG. 2, as the acid solution 11 is passed therethrough in the initial stage of the acid injection step. The path followed by the acid solution 11 is bounded by the fracture walls 7 and 8 and by the viscous fluid 9 present in the fracture. FIG. 4 shows the section of FIG. 2 at a certain moment during the continued injection of the acid solution 11, which during its passage along the fingering paths 10 has dissolved those parts of the walls 7 and 8 of the fracture that are contacted by the acid, thereby forming a channel system consisting of matching channels 12 and 13 in the walls 7 and 8, respectively.

It will be appreciated that a large variety of acids, either inorganic or organic, are available which are capable of etching the particular formation that is to be treated by the method of the invention. For etching a chalk formation, use may be made of aqueous solutions of hydrochloric acid, acetic acid, formic acid or mixtures thereof. Retarders may be added to such solutions if considered necessary. To protect the equipment in the borehole or well 2, it is often advisable to add corrosion inhibitors to the solution. In an alternative manner, solutions may be used wherein the acid is formed in situ in the formation by means of a retarded chemical reaction. Such solutions are known per se and do not require any detailed description.

After the channels 12 and 13 have been etched to an appreciable depth, the injection of the acid solution is stopped and a viscous fluid 14 carrying a propping agent is injected down the well 1 through the perforations 5 and into the fracture 4. The viscosity of this fluid 14 carrying the propping agent is chosen to be equal to or higher than the viscosity of the fluid 9 (and consequently higher than the viscosity of the acid solution 11). As a result thereof a stable displacement is reached between the carrying fluid 14 and the fluid 9 together with the acid solution 11, and the fracture 4 becomes filled with fluid 14 over the total height thereof (see FIG. 5) on continued injection of this carrying fluid. Since a propping agent is incorporated in the carrying fluid 14, the fracture 4 will also be filled with propping agent over substantially its full height. Injection of the carrying fluid with propping agent is continued until a dense packing of propping agent is present in the fracture 4.

The injection of the carrying fluid 14 takes place at a pressure sufficiently high to keep the fracture 4 open and to drive the fluid 9 (together with the spent acid solution 11) further into the formation 1. Propping agent and carrying fluid are injected in such quantities that the volume of the fracture 4 within the boundaries between which the etched channel system 15 extends (see FIG. 1) is substantially filled with propping agent.

Propping agents suitable for use in the method of the present invention are granular particles, such as silica sand. However, the invention is not restricted to the use of such agents, since any other propping agents having dimensions that allow the agent to be introduced into the fracture 4, and which are resistant against the fluids and pressures prevailing in said fracture may be used as well. Examples of such agents are glass beads, granular particles of minerals, crushed coke particles, shells, or nuts such as walnuts or coconuts.

The carrying fluid 14 may be of the same composition as the fluid 9. The viscosity of the carrying fluid is chosen to be equal to, or somewhat higher than the viscosity of the fluid 9. The viscosity of the carrying fluid will automatically be broken down after a predetermined period. Fluid break down may take place under the influence of the temperature in the formation 1, by retarded chemical action or by any other suitable viscosity breaking agent with delayed action.

After the fracture volume between the walls 7 and 8 over the area in which the channel system 10 extends has been substantially filled with propping agent, the pressure in the fracture 4 is allowed to drop. The fracture walls 7 and 8 are then allowed to become displaced towards each other under influence of the formation pressure, thereby decreasing the width of the fracture and compressing the propping agent present therein. Fracture closure is accelerated as the viscosity of the carrier fluid 14 breaks down.

Since the formation 1 consists of relatively soft material, some of the propping agent will become embedded in the fracture walls 7 and 8 (see FIG. 6) when the fluid pressure in the fracture is lowered. At some places, the fracture 4 may even close completely, thereby locally embedding all of those particles of the propping agent that are situated at the particular area. However, it has been found by laboratory experiments that the load distribution over the interior walls of the channels 12 and 13 differs from the load distribution over the non-etched parts of the walls 7 and 8 of the fracture 4. As a result of the differential load distribution the interior walls of the channels 12 and 13 will be supported by the particles of the propping agent present therein and will not collapse during the closing action of the walls 7 and 8. The channel system 10 that has been etched in the walls of the fracture 4 will thus remain open after the fluid pressure within the fracture has been allowed to fall below the fracturing pressure. This channel system 10 consists of a plurality of fingering passageways, each passageway leading from a distant location (or a plurality of distant locations) in the formation to a perforation 5 in the casing 6. Although the channels of the channel system 10 are filled with propping agent, these channels all have a relatively high fluid conductivity which will allow fluids from the formation 1 to reach the well 2 at a relatively low pressure drop, thereby substantially increasing the productivity of the well 2.

Figures 7, 8:
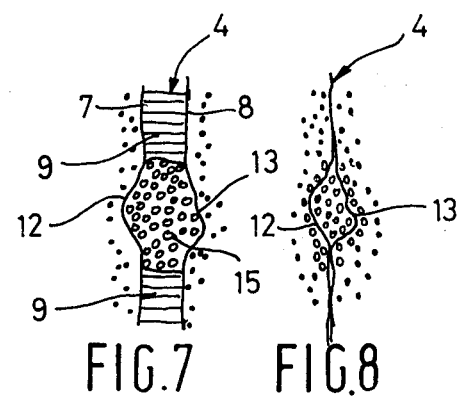
FIG. 7 shows the section of FIG. 4, when propping agent carried by a medium less viscous than the fracturing medium but more viscous than the acid has been introduced into the fracture.
FIG. 8 shows the section of FIG. 7, after the fracture has been allowed to close.

In the embodiment of the invention described with reference to FIGS. 1-6 of the drawing, a carrying fluid 14 (see FIG. 5) has been used for the transport of propping agent, which carrying fluid has a viscosity equal to, or higher than the viscosity of the viscous fluid 9. However, the method according to the invention may also be performed by using a carrying fluid having a viscosity lower than the viscosity of the viscous fluid 9, but equal to or higher than the viscosity of the acid solution. The carrying fluid together with the propping agent will then (when being injected via the perforations 5) perferentially displace the acid solution and consequently transport the propping agent along the fingering paths of the channel system 10 that have been followed earlier by the acid solution. FIG. 7 shows the section of FIG. 4, wherein the acid 11 has been displaced by the carrying fluid 15 with propping agent. It will be appreciated that the viscous fluid 9 now remains in place, and that the walls 7 and 8 of the fracture 4 will be displaced towards the closing position on lowering the fluid pressure in the fracture and the simultaneous or subsequent breakdown of the viscosities of the fluids present in the fracture. The non-etched parts of the walls 7 and 8 of the fracture 4 then close completely, and the propping agent is caught in the passageway formed by the etched channels 12 and 13. The propping agent supports the channel walls and prevents collapse of the interior walls of the channels 12 and 13 by the formation pressure.

The invention relates to the placement of a propping agent in channels that have been etched by acid action in the walls of an open fracture induced in a formation consisting of relatively acid-soluble soft rock. The channels correspond with the fingering paths that have been followed by a relatively non-viscous acid solution when such solution is injected into the open fracture that contains viscous fluid. The acid is passed into the fracture via a plurality of perforations that are spaced along that portion of the casing facing said fracture. On closing of the fracture propping agent will be trapped in the channel spaces and support the walls of the channels against collapse under influence of the formation pressures.

The invention is not restricted to the use of any particular composition of viscous fluid, acid solution, carrying fluid or propping agent. Provided that the viscosity ratio between the viscous fluid and the acid solution is chosen such that the viscous fluid is displaced by the acid solution in an unstable manner whereby fingering of the acid solution through the viscous fluid occurs any composition of viscous fluid and acid may be used to practice the invention. The viscosity of the carrying fluid should further be chosen at least equal to the viscosity of the acid solution.

Most remarkable results may be obtained by application of the method according to the present invention in acid-soluble formations having a Brinell hardness lower than 15. Equipment for measuring Brinell hardness has been described by A. C. van der Vlis in the lecture "Rock classification by a simple harness test" presented on the Second Congress of the International Society of Rock Mechanics (September 1970). Apart from chalk formations there are other types of calcium carbonate formations, such as limestone, wherein the present method may be used with advantage.

It will be appreciated that notwithstanding all measures that are being taken to obtain an equal distribution of the acid solution over all the perforations, there may be one or more perforations that have a relatively high conductivity compared to the other perforations, and take the bulk volume of the acid solution that is being injected. In such case, a slug of carrying fluid containing a propping agent is injected into the well after the walls of that portion of the fracture facing the high-conductivity perforations have been etched to an appreciable depth. This slug will pass through said perforations and enter the etched part of the fracture. Following the slug, a diverting agent is passed into the well, which agent closes off the entry to the high-conductivity perforations, such that the acid solution that is subsequently injected will now pass through the remaining perforations. If desired, this procedure may be repeated more than once. Diverting agents, as well as the methods for placing and removing the same from the perforations are known per se and do not need to be described in detail.

Buffer fluids may be injected into the formation to be treated by the present method, such buffer fluids being injected between the fracturing fluid, the carrying fluid and the acid solution. If further desired, pretreatment fluids may be injected prior to the injection of the fracturing fluid.

The method of the present invention may also be applied in wells that deviate from the vertical and/or in wells that penetrate formations that fracture horizontally.

If the well should deviate from the vertical over the height of the formation to be fractured and be situated in the plane of the fracture, the direction of the minimum tectonic stress in the formation is ascertained, and the well is directionally drilled such that the axis thereof is non-vertical, but in a plane orthogonal to the said stress direction. On fracturing the formation, the well will then be in the plane of the fracture. Since the majority of formations have the direction of the minimum tectonic stress in a horizontal plane, the fracture plane will be arranged vertically in most cases. However, the present method may be applied with equally good results in formations that fracture horizontally.

To ascertain the direction of the minimum tectonic stress, the formation may be fractured by supplying pressurized fracturing fluid to an uncased borehole in the formation, whereafter the orientation of the fracture thus formed is detected with respect to the hole. The hole may then be sidetracked at a level above the oil-containing formation, whereafter the lower part of this hole is redrilled by directional drilling in a manner such that the axis of the redrilled part of the well that passes through the oil-containing formation and extends in a plane parallel to the plane of the said fracture. After casing the borehole and perforating the casing, the formation may be fractured by supplying a pressurized fracturing fluid to the hole. The borehole will then be in the plane of the fracture.

It is observed that if the well is arranged in a plane orthogonal to the direction of the minimum tectonic stress, the perforations need not necessarily be arranged in this plane. Irrespective of the orientation of the perforations arranged in the wall of the casing, the formation will then be fractured such that the well lies in the plane of the fracture.

Although the invention has been described with reference to particular details of its perferred embodiments those of ordinary skill in the art may make modifications and changes thereto without departing from the scope or spirit of the invention as described above and claimed hereafter.

We claim:

1. A method for forming channels of high fluid conductivity in a relatively soft acid-soluble formation about a cased well which penetrates such formation and which has its casing perforated along at least a part of the casing wall which faces such formation, comprising the steps of:
   (a) producing in the formation a fracture containing a viscous fluid which communicates with the perforations
   (b) injecting an acid solution through the perforations into the viscous fluid in the fracture at a pressure at which the fracture remains open, the viscosity ratio between the viscous fluid and the acid solution being chosen such that the viscous fluid is displaced in the fracture in an unstable manner by the acid solution;
   (c) continuing the injection of the acid solution through the perforations until channels have been etched in areas of the fracture walls;
   (d) injecting a viscous carrying fluid containing a propping agent through the perforations into the fracture at a pressure at which the fracture remains open, the viscosity of the carrying fluid being at least equal to the viscosity of the acid solution;
   (e) continuing the injection of the carrying fluid and the propping agent until propping agent is present in the fracture between at least part of those areas of the fracture walls wherein channels have been etched; and
   (f) lowering the fluid pressure in the fracture, thereby allowing the fracture walls to be displaced towards a closing position, in which position the walls of the channels are supported and held open by the propping agent.

2. The method according to claim 1, wherein step (f) further includes lowering the viscosity of the viscous fluids.

3. The method of claim 2, wherein the fluid pressure in the fracture and the viscosity of the viscous fluids are lowered simultaneously.

4. The method according to claim 1 wherein the viscosity ratio between the viscous fluid and the acid solution is at least 150.

5. The method according to claim 4, wherein the viscosity ratio is between 200 and 300.

6. The method according to claim 1 wherein the viscous fluid and the carrying fluid are of the same composition.

7. The method according to claim 1 wherein the viscosity of the carrying fluid is at least equal to the viscosity of the viscous fluid.

8. The method according to claim 1 wherein the viscosity of the carrying fluid is lower than the viscosity of the viscous fluid.

9. The method according to claim 1 wherein the formation substantially consists of chalk.

10. The method according to claim 1 wherein the relatively soft formation consists of a material having a Brinell hardness lower than 15.

11. The method according to claim 1 wherein the well lies in the plane of the fracture.

* * * * *